United States Patent
Makwinski et al.

(10) Patent No.: US 7,569,775 B2
(45) Date of Patent: Aug. 4, 2009

(54) T-SHAPED RACEWAY BASE SCORING SYSTEM (WITH SLOTS)

(75) Inventors: Mark Makwinski, Cromwell, CT (US); Richard R. Picard, West Hartford, CT (US)

(73) Assignee: The Wiremold Company, West Hartford, CT (US)

( * ) Notice: Subject to any disclaimer, the term of this patent is extended or adjusted under 35 U.S.C. 154(b) by 204 days.

(21) Appl. No.: 11/479,006

(22) Filed: Jun. 30, 2006

(65) Prior Publication Data

US 2007/0000681 A1    Jan. 4, 2007

Related U.S. Application Data

(63) Continuation-in-part of application No. 11/035,477, filed on Jan. 13, 2005, now Pat. No. 7,262,371.

(51) Int. Cl.
*H02G 3/08*    (2006.01)
(52) U.S. Cl. .............. 174/481; 174/480; 174/68.3; 174/68.1; 52/220.1; 52/220.7
(58) Field of Classification Search ............... 174/480, 174/481, 60, 67, 68.1, 68.3, 95, 97, 99 R, 174/96, 135, 72 R, 101; 220/3.2, 3.8, 3.5, 220/3.4; 439/207, 210, 211, 212, 213; 52/220.1, 52/220.3, 220.7, 220.8, 249; 385/134, 135; 138/162
See application file for complete search history.

(56) References Cited

U.S. PATENT DOCUMENTS

| | | | |
|---|---|---|---|
| 594,998 A * | 12/1897 | Lyle | .......................... 174/72 R |
| 4,308,418 A | 12/1981 | Van Kuik et al. | |
| 4,952,163 A | 8/1990 | Dola et al. | |
| 5,336,849 A | 8/1994 | Whitney | |
| 5,614,695 A | 3/1997 | Benito Navazo | |
| 5,629,496 A | 5/1997 | Navazo | |
| 5,942,724 A | 8/1999 | Russo et al. | |
| 6,156,977 A * | 12/2000 | Benito-Navazo | ............. 174/97 |
| 6,259,020 B1 * | 7/2001 | Ashline et al. | ............. 174/68.3 |
| 6,323,421 B1 * | 11/2001 | Pawson et al. | ............. 174/68.1 |
| 6,380,486 B1 * | 4/2002 | Hemingway et al. | .......... 174/97 |
| 6,664,467 B1 * | 12/2003 | de la Borbolla | ............ 174/68.3 |
| 6,727,434 B2 | 4/2004 | Jadaud et al. | |
| 7,009,108 B2 * | 3/2006 | Vargas et al. | ............... 174/68.3 |
| 7,045,707 B1 * | 5/2006 | Galasso | ..................... 174/68.1 |
| 7,262,371 B2 * | 8/2007 | Makwinski et al. | ......... 174/481 |
| 7,332,675 B2 * | 2/2008 | Galasso | ...................... 174/97 |

\* cited by examiner

*Primary Examiner*—Angel R Estrada
(74) *Attorney, Agent, or Firm*—McCormick, Paulding & Huber LLP

(57) ABSTRACT

T-shaped raceway base components are provided of standard length, and the flat back plate portions are scored at intervals. The forwardly projecting web portion of the T-shaped base has a leading edge that defines opposed flanges for receiving cover components, and these covers also mount to the top and bottom marginal edges of the back plate. These marginal edges and the flange defining leading edge provide regions of continuity for the raceway base to give the base sufficient stiffness so the web itself can be slotted at each of the same intervals where the lines of weakening are provided. To sever the base at one of these intervals, the installer can snip these three edge regions of continuity, and flex the base to separate it at a selected interval location. The same concept is used to provide the same advantage for raceway base coupling elements that can be used to join raceway components with gaps therebetween.

4 Claims, 5 Drawing Sheets

T-SHAPED RACEWAY BASE SCORING SYSTEM (WITH SLOTS)

This application is a continuation-in-part of, and incorporates by reference, a utility (non-provisional) application entitled Modular Raceway with Base and Integral Divider, Ser. No. 11/035,477 filed Jan. 13, 2005.

SUMMARY OF APPLICATION SER. NO. 11/035,477

The relevant features of the above-identified application are incorporated by reference and are summarized below:

The raceway components comprise a T-shaped raceway base having a flat rear wall for abutting a building wall structure, and a forwardly projecting divider wall or web, the web having downwardly and upwardly directed flanges at its leading edge, for receiving marginal edge portions of L-shaped raceway covers. Each of these covers also has socket-defining portions that are received by top and bottom marginal edges of the rear wall of the T-shaped raceway base, adjacent to the wall structure to which the raceway is mounted. The T-shaped base is described in the above pending patent as "scored" to provide lines of weakening at equally spaced increments to provide for selection reduction in the length of the raceway base at installation. That co-pending application also shows and describes the concept of providing, in each segment or increment of raceway base, pre-punched mounting holes, and providing knock out openings for running wires through the T-shaped raceway base from one wireway to another, that is from the upper to the lower wireway of the divided raceway.

SUMMARY OF THE INVENTION

The present invention also relates to the scoring of such T-shaped raceway base, and deals more particularly with a unique combination of scoring and slotting of the raceway base. The same concept is applied to raceway coupling elements, used between adjacent raceway base members to allow for expansion or contraction of the combined length of two adjacent raceway base members, and to allow fitting the raceway along a wall structure of predetermined length at installation.

Each coupling member comprises an L-shaped element that is adapted to be received between the base divider wall or web, and a marginal edge of the rear wall of the T-shaped base, to define a continuation of each of the upwardly and downwardly open wireways defined by the base. The coupling elements act as continuations of the base to span the gap between adjacent raceway base members on a wall structure. More particularly, these coupling elements are also scored, and slotted in accordance with the invention, to permit an installer to utilize one of at least two coupling element lengths, as determined by the gap/distance between adjacent raceway base members. A wall structure of any length can accommodate that is to be fitted with raceway of the present invention without precision cutting at installation.

In a building having a structural wall to be fitted with raceway in accordance with the present invention, the installer would typically start at a corner (either internal or external) and along the wall structure he/she would fit one or more raceway base members into the space available according to the following general method.

Step 1: install one or more raceway base members along the wall, and in alignment with one another. These base members can be butted to one another, or, per the invention, gaps can be provided between these raceway base members. Coupling elements are arranged in pairs in the top and bottom wireways defined by the T-shaped raceway base, whether the base members are butted up to one another, or whether a gap is provided therebetween. A convenient "starting" point may be a corner of the room where a corner assembly is mounted first, and the raceway base coupled to the corner assembly base as suggested at E in FIG. 2.

Step 2: when the installer comes to the end of that length of structural wall, as when encountering another wall structure obstruction or corner, he/she may shorten a base member, so as to span the gap between the end of the last base member, and that corner or obstruction.

Such a shorter base member is fabricated in the field, not by precision cutting of the raceway as in the past, but rather by breaking away the raceway of the present invention in the following fashion. First the installer will snip or cut preselected portions of the T-shaped raceway base member at preselected areas of continuity adjacent the slotted areas, following which he can flex the base member to break away the flat rear wall portion along a scored line.

Once the shorter base member has been installed on the wall the installer can then continue with an internal or external corner assembly of the type described in a commonly owned application identified by Ser. No. 11/111,578, now U.S. Pat. No. 7,045,707.

DETAILED DESCRIPTION

Figure 11:
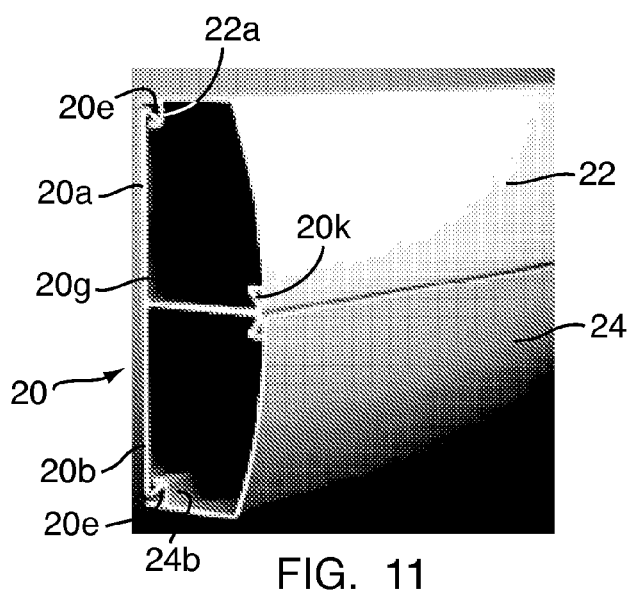
FIG. 11 is a perspective view through an assembled raceway base, and upper and lower raceway cover.

Turning now to the drawings in greater detail, FIG. 11 shows, in section, the raceway base with raceway covers installed. Upper and lower wireways are defined by the T-shaped base 20, and an upper cover 22 and a lower cover 24. The covers are of L-shape and enclose these wireways in a unique arrangement that affords easy access to the wireways before the covers are installed.

Figure 1:
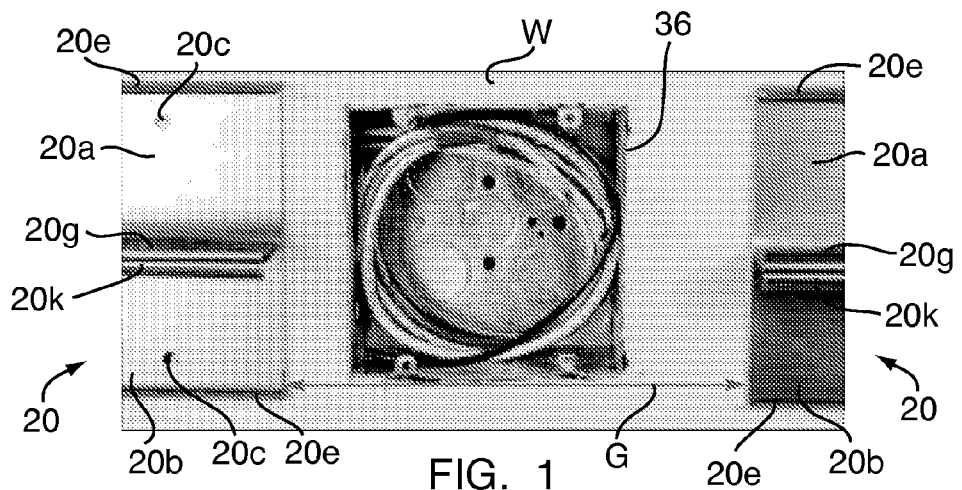
FIG. 1 shows two raceway base components with a gap therebetween, and an in-feed box for feeding wires from a source inside the wall.
Figure 2:
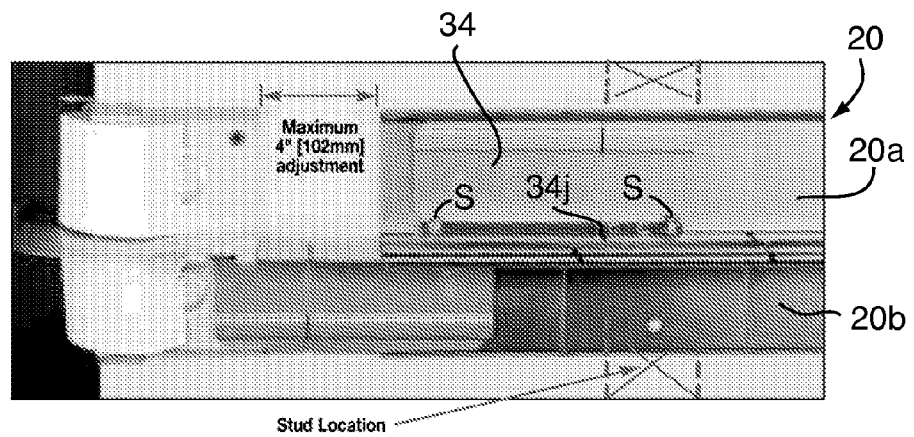
FIG. 2 shows a raceway base spaced from an external corner elbow base, and coupling elements for spanning a gap between the raceway base and the elbow base.

Each base member 20 is of T-shaped cross section, and of a predetermined standard length (as for example eight or ten feet), each base member includes a flat rear wall portion defined by upper 20a and lower 20b plate portions adapted to abut an existing wall structure (W), as suggested in FIG. 1. A forwardly projecting web portion 20g of the base 20 cooperates with these flat portions 20a and 20b to define the T-shaped base 20.

Figure 3:
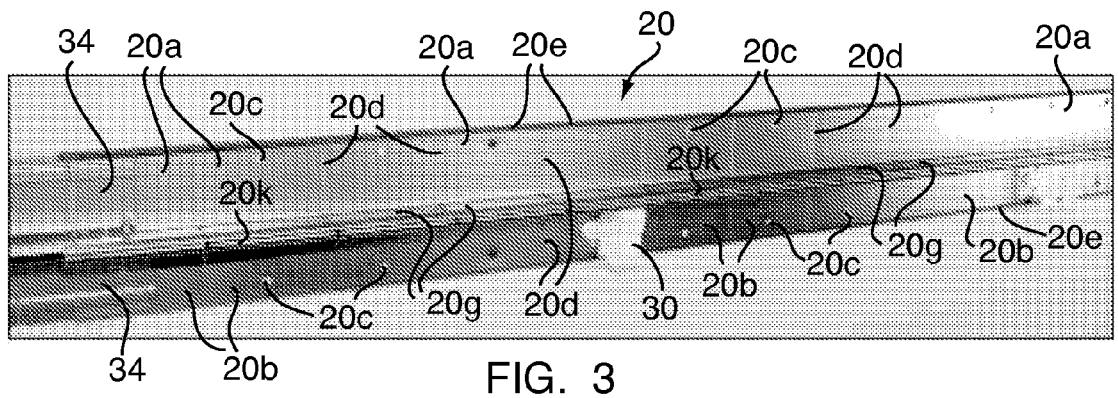
FIG. 3 shows a raceway base having wire clips mounted in the lower wireway, and having coupling elements at the left hand end for joining one raceway base to another, or to an external or internal corner assembly.
Figure 6A:
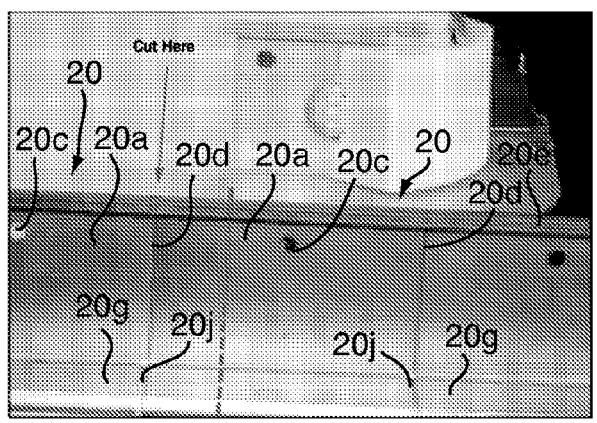
FIG. 6A shows the raceway base of FIGS. 1-3 being held up to the wall structure where an external corner elbow has been provided, and illustrates where the raceway must be severed, short of the actual length (dotted line) on the score line (arrow indicating "cut here").
Figure 6B:
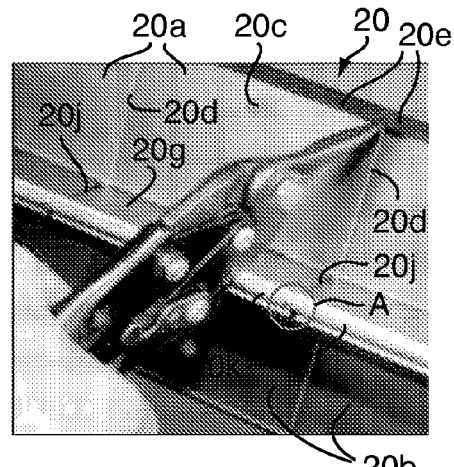
FIG. 6B shows the raceway base of FIG. 6A being cut adjacent the selected score line from FIG. 6A.

Pre-punched openings 20c are provided in each of these flat upper and lower plate portions 20a and 20b of the rear wall of the raceway base 20 for use in attaching the base members to the wall structure (see FIG. 3). These openings 20c are preferably spaced eight inches on center, as are the spaced lines of weakening, or score lines 20d. The web portion 20g has a slot 20j aligned with these lines of weakening 20d, as best shown in FIGS. 6A and 6B.

Figure 4:
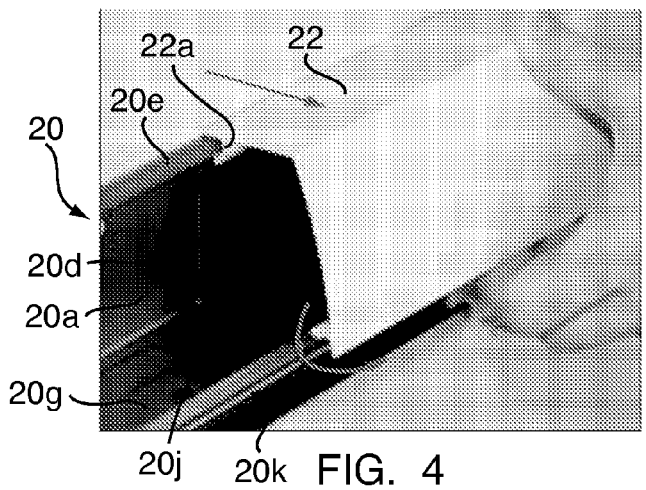
FIG. 4 shows the raceway base of FIGS. 1-3 being fitted with a raceway cover for the upper, or top wireway.
Figure 5:
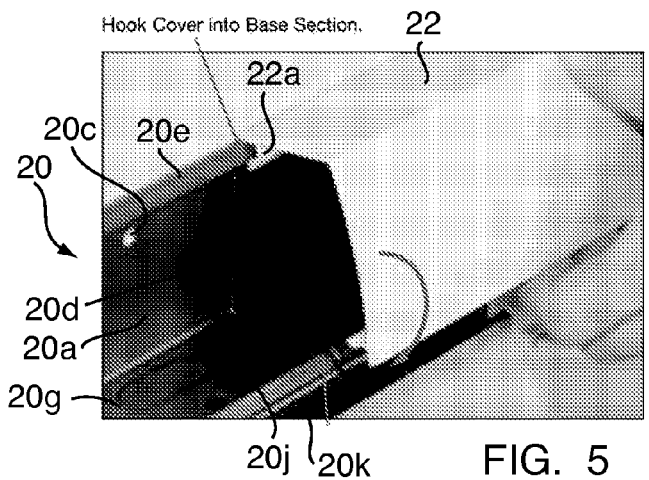
FIG. 5 shows the upper cover of FIG. 4 being snapped into place, to close the upper wireway, and define the front facing and top boundaries of the upper wireway.

The T-shaped raceway base 20 has upper and lower rear flat plate portions 20a, 20b as mentioned, and each flat plate portion has an upper and lower marginal edge, respectively, defining a flange 20e for receiving a socket-defining edge of upper and lower covers 22 and 24, such as shown in FIGS. 4 and 5. The lower cover 24 may be identical in cross section to the L-shape of the upper cover 22, but is reversed in its orientation, so each can be mounted between the web and one of the flanges 20e of base 20.

Figure 12:
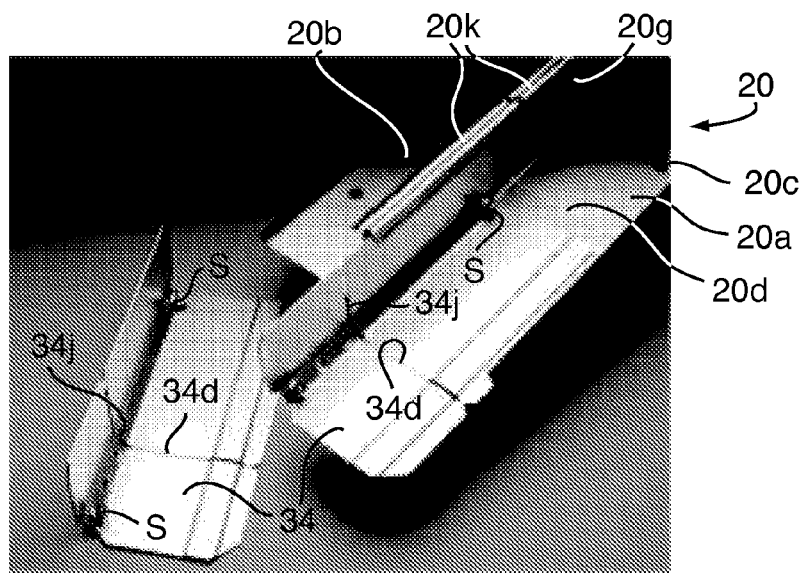
FIG. 12 is a perspective view of a raceway base with upper and lower coupling elements, one of which is assembled with the base and one being ready for assembly, either by sliding it into place, or snapping it into the raceway base.

Still with reference to the T-shaped elongated base configuration, the forwardly projecting web portion 20g has an elongated leading edge 20k best shown in FIGS. 11 and 12. This leading edge 20k of the web 20g defines mutually opposed elongated lip portions that are adapted to receive rearwardly projecting elongated sockets provided for this purpose in each of the upper and lower raceway covers 22 and 24. The upper raceway cover 22 is shown in the process of being installed with the base in FIGS. 4 and 5.

The raceway cover defined sockets 22a and 24b are received by the in-turned lips provided along the marginal edges of the raceway base rear plate portions (see FIG. 11). Although FIG. 11 shows this assembly with the base and covers being of the same length, such is not required, and the covers may overlap butted, or spaced, raceway base components, as described in our above-identified co-pending patent application.

Thus, the T-shaped raceway base member defines, at least in part, upper and lower wireways that (prior to installation of covers 22 and 24) are forwardly and upwardly open in the case of the top wireway, and forwardly and downwardly open in the case of the bottom wireway. These top and bottom wireways are enclosed by the L-shaped raceway covers 22 and 24, respectively. The upper and lower raceway covers are so easily snapped in place, as described and as shown in detail in FIGS. 4 and 5.

During the installation process, wires are first laid into the top wireway, by resting them on the forwardly projecting web portion 20g of the T-shaped base 20. The web 20g provides a shelf for supporting the wiring/cables to be located in the upper wireway. The lower wireway is preferably fitted with plastic clips 30 that can be snapped into the lower wireway below the web 20g of the T-shaped raceway base as shown in FIG. 3, for the convenience of the installer. Such clips 30 can also be used in the upper wireway, as suggested for example in FIG. 8, but are especially useful in laying wires/cables in the lower wireway.

The lines of weakening 20d, provided in the flat rear wall portions of the raceway base 20, are aligned with slots 20j provided in the forwardly projecting web portion 20g of the base 20. These transverse slots 20j, 20j are provided at intervals (8 inches) corresponding to the intervals for the lines of weakening in the raceway base rear wall plate portions 20a and 20b.

Figures 7, 8:
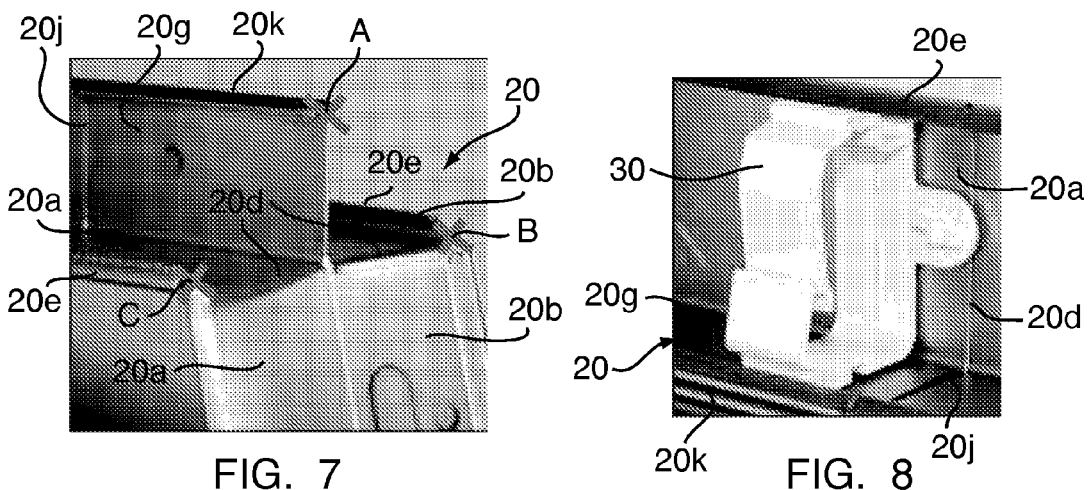
FIG. 7 shows the raceway base of FIGS. 6A and 6B after severing both marginal edges, and severing a third area of continuity at the free marginal edge of the web or divider, and then flexing the raceway base to separate it at the selected score line.
FIG. 8 shows details of the plastic wire clips fitted into the raceway base wireway.

These slots 20j do not, however, open out to the leading edge of the web portion 20g, but instead are so defined as to provide a region of continuity adjacent to that leading edge 20k. This region of continuity is accessible, and can be cut away with shears or other means in the area designated at A in FIG. 6B. FIG. 7 shows the result achieved after snipping away both regions of continuity associated with both marginal edges of base 20. See area B and area C in FIG. 7.

Once the upper and lower marginal edges 20a and 20b of the flat rear wall portion of the T-shaped base member are so severed in these regions of continuity, as suggested at A, B and C in FIG. 7. The base can be flexed on a line of weakening as also shown in FIG. 7. These base member regions of continuity (A, B and C) provide the necessary rigidity for the T-shaped raceway base components to enable their installation on a wall structure. These areas of continuity also support the L-shaped raceway covers as mentioned previously. It is a feature of the present invention that these regions of continuity (A, B and C) in both the web and the marginal edges of the rear wall of the raceway base, can be snipped with shears as shown in FIGS. 6B and 7. Once snipped, as shown at A, the leading edge of the web portion in FIG. 6B, the web portion is unconnected as a result of the slot 20j, following which the raceway base can be flexed as suggested in FIG. 7, to separate the raceway at the line of weakening 20d.

In Summary, T-shaped raceway base members of standard length can be installed on a wall such that gaps G can be provided, as required between adjacent wireway base members, and coupling elements 34 installed at these gaps, or at the interface between abutting raceways, as space requirements dictate. At the end of the wall structure, where the installer encounters an obstacle or other interruption in the building structure itself, the last raceway base member can be shortened as required to fit in the available wall space, as suggested in FIG. 6A.

Figure 9A:
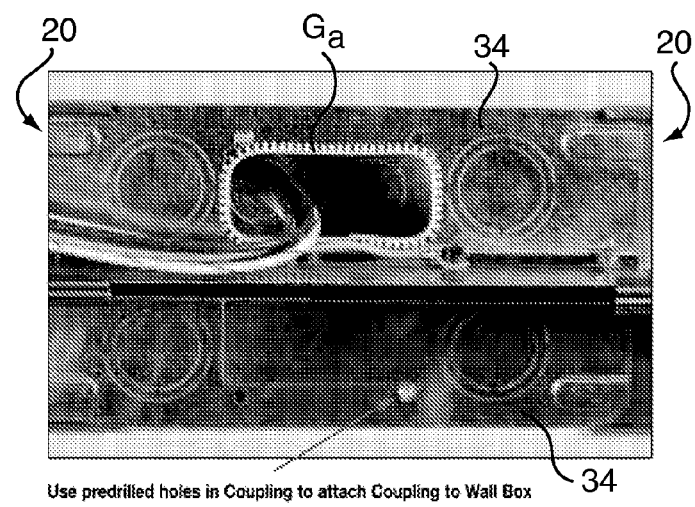
FIG. 9A shows upper and lower coupling elements, one of which has knock-out openings for feeding wires from a wall box such as shown in FIG. 1.
Figure 9B:
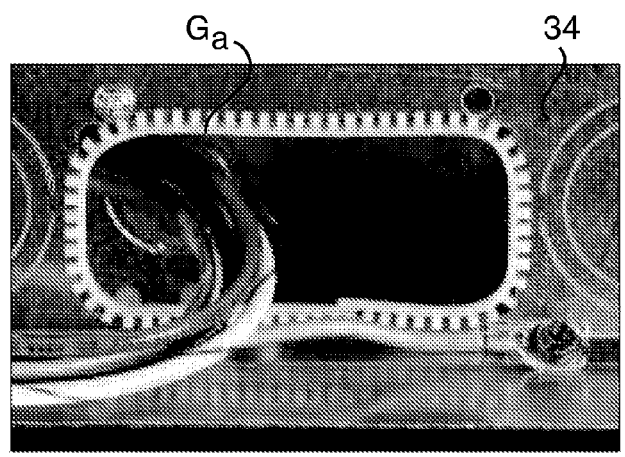
FIG. 9B shows details of a grommet used in the knock-out opening of FIG. 9A.

Turning next to a more detailed description of the coupling elements 34 provided between the aligned, and butted or separated raceway base members, FIG. 1 shows raceway members 20, 20 with a gap G therebetween. An in-feed wall box 36 is located between these raceway base components 20,20. The wall box has wires (shown coiled inside box 36) for feeding to one side or the other of the raceway. Thus, the wiring can be fed through either one or both of two coupling elements, as suggested in FIG. 9A. Two coupling elements 32,32 are snap fit, or slid into the ends of the raceway base components 20,20 for this purpose (see FIG. 9A). FIG. 9B shows details of a grommet Ga provided in a knockout opening of the upper coupling 34.

Figure 10:
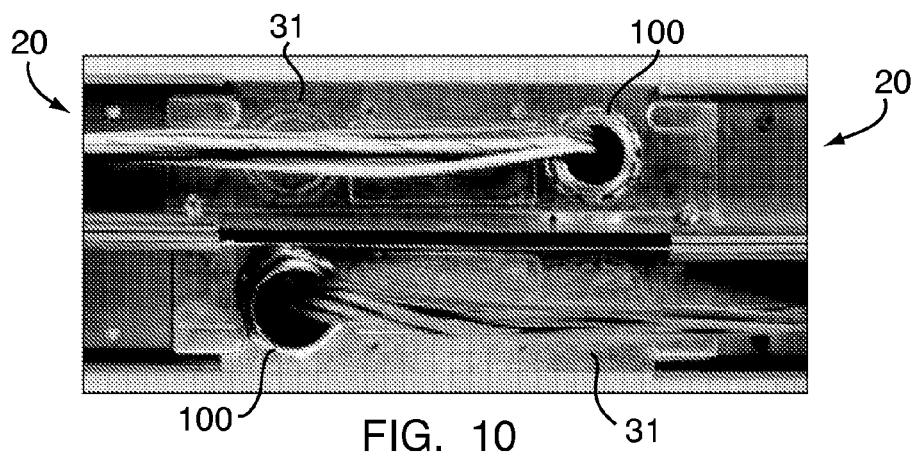
FIG. 10 shows upper and lower coupling elements over an outlet box from which wires are fed from a conduit or other source in the wall structure into the raceway.

Still another alternative for feeding wires into the raceway is through a back feed coupling, such as illustrated at 31,31 in FIG. 10, where the back feed is through a conduit fitting 100 of the type sometimes used with wall boxes of the type provided for "pipe and tube" electrical installations.

Figure 13:
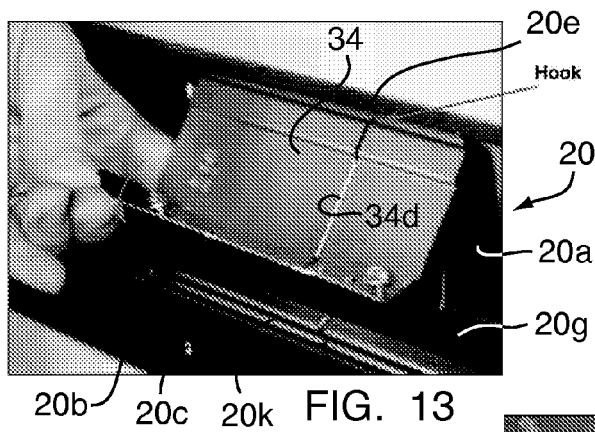
FIG. 13 shows a coupling element, such as that shown in FIG. 12, in the process of assembly with two abutting raceway base components, by hooking the top edge behind the upper marginal edge lip of the base, and snapping the lower edge behind the free edge of the divider web in the raceway base.
Figure 14:
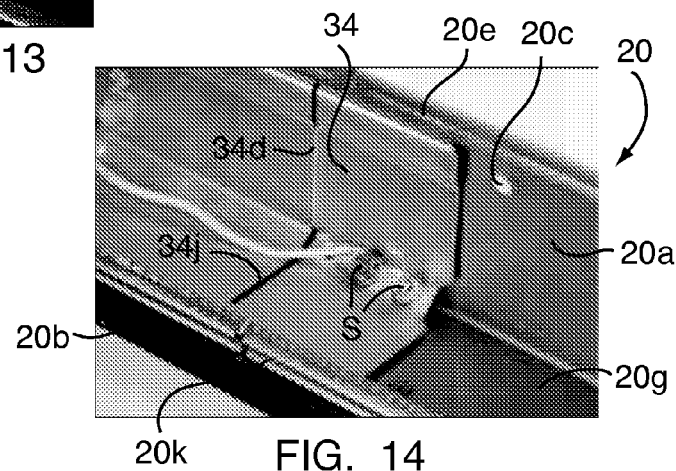
FIG. 14 shows the coupling element of FIG. 13 assembled with the butted raceway base components, and also shows how the mounting screws hold it in place, with one screw used as a ground screw.

FIG. 12 shows two coupling elements 34,34 which are designed for being snapped into the upper and the lower wireway defined by the raceway base 20. The installation process is best shown in FIGS. 13 through 15. The coupling element 34 can be grounded to a raceway base member, as suggested by the grounding screw S in FIG. 14. Such screws serve as both mounting and grounding screws.

Figure 15A:
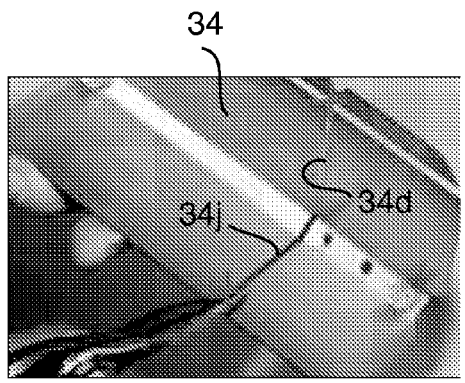
FIGS. 15A, 15B and 15C show the coupling element of FIG. 13 being shortened to interconnect the abutting raceway base component. A slot extends across one of the two legs of the L-shaped coupling element. Areas of continuity at the edges (marked with x) must be severed to provide the shortened coupling element for interconnecting the base components. The other leg of the L-shaped coupling element is scored, and may be flexed as shown in FIG. 15B, so it can be used to connect abutting raceway as suggested in FIG. 15C.
Figure 15B:
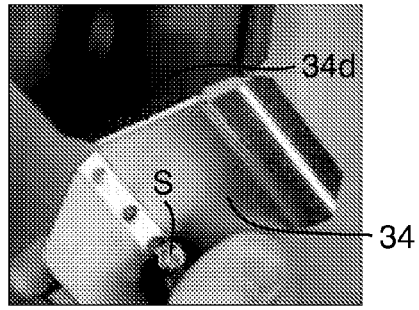
Figure 15C:
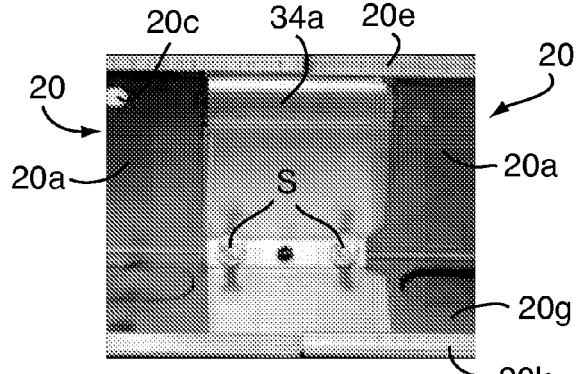

Similar screws are provided at the opposite end of the coupling element 34 for purposes of securing the coupling element into raceway base member. FIG. 14 shows two screws at S,S. The coupling element 34 is provided with a slot 34j extending along the majority of one side of its L-shape, as best shown in FIG. 14. The outer flange, or edge portion of the coupling element 34, is provided with a region of continuity, that can be snipped if a reduction in length is required, for use in joining butted raceway base members that have no gap provided therebetween (see FIGS. 15A, 15B and 15C). The other side of each L-shaped coupling element 34 does not require a slot, but instead has a line of weakening or score lines 34d, so that once the coupling is snipped (as shown in FIG. 15A) it can be flexed, to sever the coupling 34 on the score line 34d, and to form a shorter coupling element for the purpose described above.

Where no gap is provided between two aligned raceway base members, as shown in FIG. 15C, the coupling element 34 can be shortened as described. The region of continuity at the coupling element flange can be severed much like the flange shown at C in FIGS. 6 and 7 for the base 20. This yields a relatively small coupling 34a for use with butted raceways. FIG. 15C shows this smaller coupling in place within the raceway, and with grounding screws used for achieving electrical continuity between the abutting raceway base members 20 and 20.

In summary, the present invention relates to elongated T-shaped raceway base components, or members 20 that can be selectively reduced in length for fitting "standard" length raceway base members into a wall structure of predetermined length or extent. The invention also relates to a raceway coupling element that can be used in the upper and lower wireways to connect spaced apart raceway base members. These base members might be either butting or spaced apart. The coupling element is designed to be selectively shortened, for use in situations where the raceway base members will butt one next to another. These same coupling elements 34 can be used to provide a significant gap G between the raceway base members, all as described in co-pending application Ser. No. 11/035,477 incorporated by reference herein.

What is claimed is:

1. An elongated raceway base having a cross sectional shape with a flat rear wall for abutting a building structure wall surface, said raceway base having at least one forwardly projecting integrally formed web portion oriented generally perpendicularly to said flat rear wall portion, said web portion having an elongated leading edge, said flat portion having lines of weakening at spaced intervals along its length, said web portion having transverse slots provided at intervals corresponding to said lines of weakening, and said leading edge having a region of continuity without said transverse slots, whereby cutting said leading edge continuity region allows the installer to sever said base simply by cutting these continuity regions and flexing the raceway base to sever the rear wall portion, achieving a raceway base of reduced length, and said web portion leading edge defines oppositely directed flanges, and wherein said flat rear portion of said base has upper and lower marginal edges that are offset forwardly, and said flanges in said leading edge of said web portion defining upwardly and downwardly open top and bottom wireways, respectively.

2. The raceway base according to claim 1, further characterized by L-shaped raceway upper and lower covers having sockets extending along the longitudinal edges thereof, which sockets are adapted to be received by said flanges of said web portion leading edge and said marginal edges of said flat rear raceway wall portions, said covers further defining said upper and lower wireways.

3. The combination according to claim 1, further comprising raceway base couplings slidably receivable in said upper and lower wireways and shaped to fit alongside said flat rear wall portions of said base and alongside said web portion to span any gap between aligned raceway base members installed on a wall structure in spaced relationship to one another.

4. The combination according to claim 3 wherein said raceway base couplings are themselves provided with lines of weakening to permit spanning a range of gaps between aligned raceway base members.

* * * * *